L. C. VITTORIO
BRAKE FOR ELECTRIC MOTOR OPERATED HOISTS.
APPLICATION FILED AUG. 20, 1920.
1,374,259.
Patented Apr. 12, 1921.
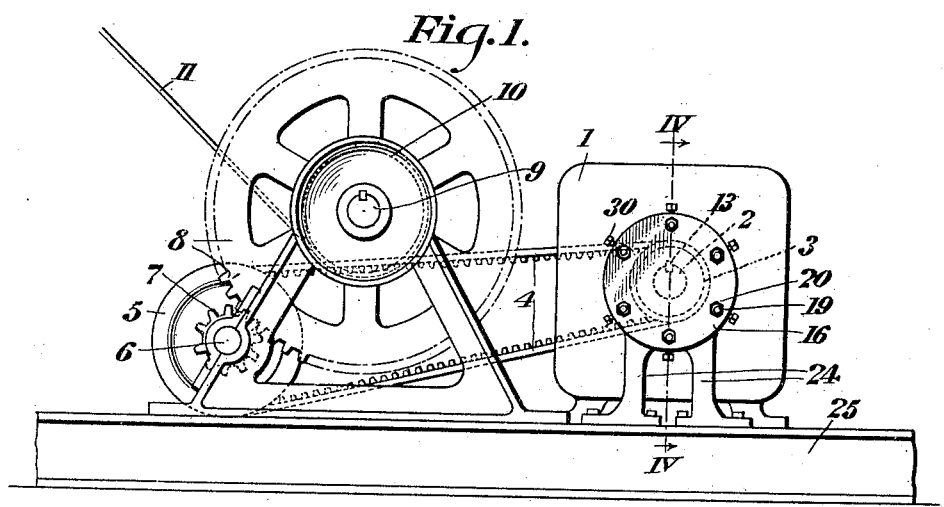
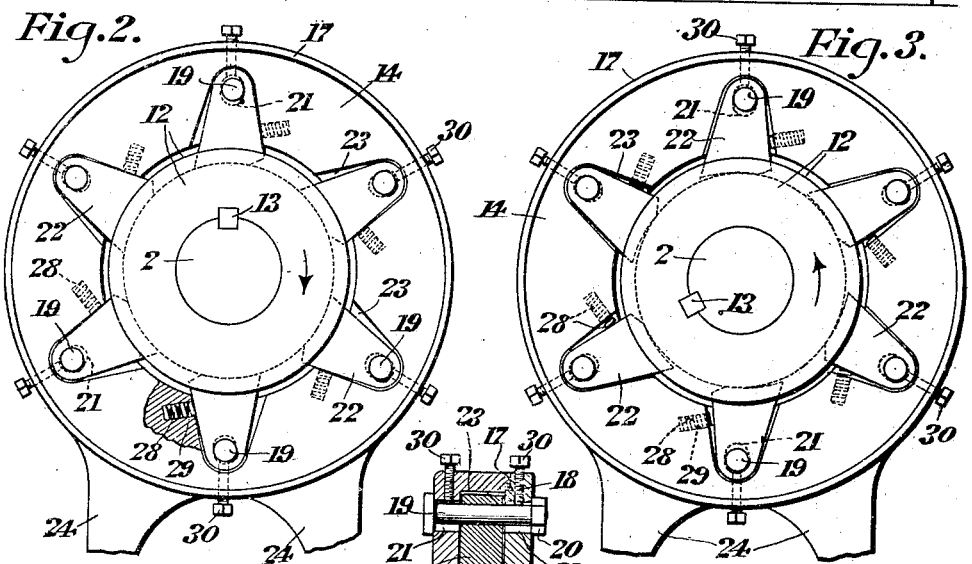
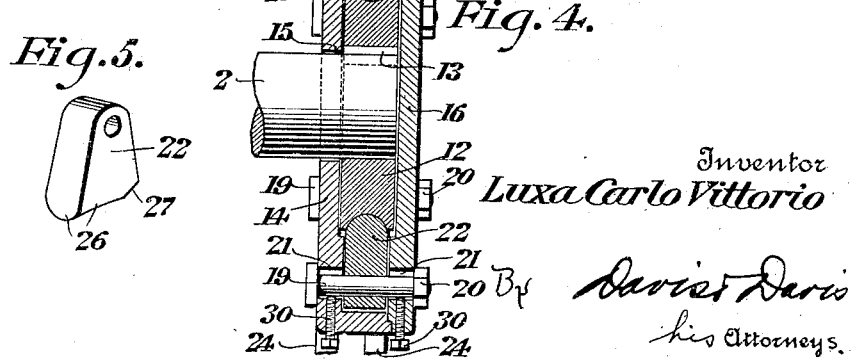
Inventor
Luxa Carlo Vittorio
By Davis & Davis
his Attorneys.

UNITED STATES PATENT OFFICE.

LUXA CARLO VITTORIO, OF EMERSON, NEW JERSEY, ASSIGNOR TO THOMAS & BUCKLEY HOISTING CO., OF NEW YORK, N. Y., A CORPORATION OF NEW YORK.

BRAKE FOR ELECTRIC-MOTOR-OPERATED HOISTS.

1,374,259.   Specification of Letters Patent.   Patented Apr. 12, 1921.

Application filed August 20, 1920. Serial No. 404,767.

*To all whom it may concern:*

Be it known that I, LUXA CARLO VITTORIO, a citizen of Austria, and resident of Emerson, in the county of Bergen and State of New Jersey, have invented certain new and useful Improvements in Brakes for Electric-Motor-Operated Hoists, (Case B,) of which the following is a specification.

This invention relates to improvements in automatically acting brakes for electric-motor-operated hoisting apparatus designed to prevent dropping of the load when the motor circuit is broken.

As is well known, the armature shaft of an electric motor is free to rotate in either direction when the motor circuit is broken and it is therefore necessary in electric-motor driven hoists to provide means for preventing the pull of the load on the hoisting cable from unwinding the cable from the drum when the motor is stopped after the load is lifted to the desired point, or when the circuit is broken from any other cause, such as blowing of a fuse.

The object of the present invention is to provide a simple, efficient and quick-acting friction brake which will instantly lock the armature shaft of the hoist motor if the shaft starts to rotate in the reverse direction and which will automatically release the shaft and permit it to freely rotate when current is supplied to the motor.

In the drawings:

Figure 1 is a fragmentary side elevation of an electric motor operated hoisting apparatus provided with the improved automatic brake;

Fig. 2 a side elevation of the brake with the outer plate of the brake-housing removed, the parts being shown in the position assumed thereby when the motor shaft is rotating in a direction to elevate a load;

Fig. 3 a view similar to Fig. 2 showing the brake in shaft-locking position;

Fig. 4 a vertical section on the line IV—IV of Fig. 1; and

Fig. 5 a perspective view of one of the brake shoes.

Referring to the drawings by numerals, 1 designates the electric motor upon the armature shaft 2 of which is fixed a pulley 3 connected by a belt 4 with a pulley 5 on a counter shaft 6. A pinion 7 on the shaft 6 meshes with a gear 8 on the shaft 9, and a hoisting drum 10 having a hoisting cable 11 wound thereon is also mounted on shaft 9. The foregoing parts constitute part of a well-known form of electric motor driven hoisting apparatus and it will be understood that my invention may be applied to various other types of electric motor operated hoists. It will also be understood that the usual drum-releasing clutch, not shown, is provided for permitting lowering of the hoisting tackle by gravity.

Upon the outer end of the armature shaft 2 of the motor, I fix a brake drum 12 having a grooved perimeter. The drum 12 is locked on shaft 2 by a key 13 and is inclosed in a cylindrical housing 14 having a removable outer end wall or face plate 16. The motor shaft 2 extends through a central aperture 15 in the inner end wall of the housing 14 and said housing is provided with standards 24 bolted to the bed 25 of the hoisting apparatus. The inner face of plate 16 is cut away around the outer edge of the plate to form a shoulder 18 and the annular wall of the main body portion 14 of the casing is provided with an annular flange 17 embracing shoulder 18 and preventing edgewise movement of the face plate 16.

The plate 16 and the opposite end wall of the body portion 14 of the housing are provided with registering radially extending slots 21 through which the pivot bolts 19 of the circular series of brake shoes 22 extend. These pivot bolts are adjustable in slots 21 toward the axis of shaft 2 to compensate for wear of the brake shoes 22 and drum 12 and are clamped in adjusted position by nuts 20. Bolts 19 and nuts 20 also serve to hold the two sections 14 and 16 of the brake housing together. I also provide two series of radially extending set screws 30, one series of which is threaded through the section 14 of the housing and the other through plate 16 into the slots 21 so as to bear against the shanks of the pivot bolts 19 and prevent the same from being thrust radially outward from their adjusted positions by pressure on the brake shoes.

The brake shoes comprise elongated blocks provided with apertures at their outer ends through which bolts 19 extend so that the shoes are free to swing about the bolts. The side edges of the shoes flare outwardly toward the free ends of the shoes and said shoes are set in similarly shaped recesses 23 which are wider than the shoes to permit the shoes to rock in said recesses. The free ends of the shoes project beyond the inner ends of recesses 23 into the groove in the perimeter of the friction drum 12, the inner ends of the shoes having main curved portions 26 which, when the shoes are in the position shown in Fig. 2, are concentric with the friction surface of the drum and in light frictional engagement therewith, and heel portions 27 tangential to the friction surface of the drum. Both portions 26 and 27 of the inner ends of the shoes are rounded in cross section to adapt the same to fit in the groove in the perimeter of the drum 12. A series of light coiled springs 28 in recesses 29 in the main body 14 of the housing press lightly against the adjacent edges of shoes 22 and constantly urge the same toward the position shown in Fig. 3 to cause the portion of each shoe adjacent the junction of heel 27 with arcuate portion 26 to bind tightly on or bite the friction surface of the drum.

When current is supplied to the motor to cause the cable 11 to be wound upon the hoisting drum 10 and lift the load, the shaft 2 and brake drum 12 rotate in the direction shown by the arrow in Fig. 2 and it will be obvious that the frictional engagement of the brake drum 12 with shoes 22 will rock the shoes to the position shown in Fig. 2 as soon as the shaft begins to rotate and hold them in this position against the pressure of the light springs 28 as long as the shaft continues to rotate in this direction. If the motor circuit is broken the pull of the load on cable 11 will start to rotate shaft 2 and brake drum 12 in the reverse direction, whereupon the springs 28 as well as the friction contact of the shoes 22 with drum 12 will rock the shoes to the position shown in Fig. 3 and cause the inner ends of the shoes to bind tightly on the drum and thus almost instantly lock the shaft 2 against reverse rotation. The stopping of shaft 2 will, of course, prevent further unwinding of the cable 11 as the drum 10 is geared to the shaft 2. The load will be arrested after a very slight downward movement thereof and before it acquires any momentum, thus avoiding shocks to the hoisting apparatus. Slipping is impossible even with very heavy loads, since the greater the weight of the load the tighter will be the gripping action of the shoes 22 on the drum 12. It will be observed that the extent of pivotal movement of the shoes 22 against the tension of springs 28 is limited by one edge of each shoe striking the adjacent side wall of the recess 23 in which the shoe is located, so that rocking of the shoe in this direction beyond a point at which the arcuate edge portion 26 thereof is concentric with the perimeter of the brake drum is prevented. It is impossible, therefore, for the shoes to bind on the brake drum when the motor shaft is rotating in a direction to wind the cable 11 on the hoisting drum 10.

What I claim is:

1. In an electric motor operated hoisting apparatus, the combination with the armature shaft of the motor of a brake drum fixed on the shaft having an external friction surface, a series of brake shoes around the perimeter of the drum pivotally supported adjacent their outer ends to swing about axes extending transversely of the drum and each having a drum-engaging friction surface at its inner end curved on the same arc as the friction surface of the drum, and means for limiting the pivotal movement of the brake shoes in one direction to positions in which the friction surfaces thereof are concentric with the friction surface of the drum.

2. In an electric motor operated hoisting apparatus, the combination with the armature shaft of the motor of a brake drum fixed on the shaft having an external friction surface, a series of brake shoes around the perimeter of the drum pivotally supported adjacent their outer ends to swing about axes extending transversely of the drum and each having a drum-engaging friction surface at its inner end curved on the same arc as the friction surface of the drum, springs normally tending to swing the shoes in one direction, and means for limiting the swinging movement of the shoes in the opposite direction to positions in which the friction surfaces of the shoes are concentric with the friction surface of the drum.

3. In an electric motor operated hoisting apparatus, the combination of a brake drum fixed on the motor shaft having an external friction surface, a series of radially extending brake shoes each having a drum-engaging friction surface at its inner end curved on the same arc as the friction surface of the drum, means individually adjustable toward and from the axis of the drum for pivotally supporting the brake shoes adjacent their outer ends to swing about axes extending transversely of the drum, and means for limiting the swinging movement of the shoes in one direction to positions in which the friction surfaces thereof are concentric with the friction surface of the drum.

4. In an electric motor operated hoisting apparatus, the combination of a brake drum fixed on the motor shaft having an external friction surface, a series of radially extending brake shoes each having a drum-engaging friction surface at its inner end curved on the same arc as the friction surface of the drum, means individually adjustable toward and from the axis of the drum for pivotally supporting the brake shoes adjacent their outer ends to swing about axes extending transversely of the drum, means for limiting the swinging movement of the shoes in one direction to positions in which the friction surfaces thereof are concentric with the friction surface of the drum, and individual springs normally tending to swing the shoes in the opposite direction.

5. The combination with an electric hoist motor, of a brake drum rotatable with the armature shaft of the motor, a cylindrical housing surrounding the drum having a series of radially extending recesses in the annular wall thereof, a series of brake shoes projecting inwardly from said recesses into engagement with the drum, means for pivotally supporting the shoes adjacent their outer ends to swing in said recesses, and springs normally tending to swing the shoes in one direction, each of said shoes having its inner end curved on the same arc as the friction surface of the drum and said recesses being so shaped as to arrest the swinging movement of the shoes in opposition to the springs when the arcuate friction surfaces of the shoes are concentric with the friction surface of the drum.

In testimony whereof I hereunto affix my signature.

LUXA CARLO VITTORIO.